US009948613B2

(12) United States Patent
Jeong et al.

(10) Patent No.: US 9,948,613 B2
(45) Date of Patent: *Apr. 17, 2018

(54) METHOD AND APPARATUS FOR MANAGING DEVICE CONTEXT USING AN IP ADDRESS IN A COMMUNICATION SYSTEM

(71) Applicant: Samsung Electronics Co., Ltd., Suwon-si, Gyeonggi-do (KR)

(72) Inventors: Sang Soo Jeong, Suwon-si (KR); Jung Je Son, Yongin-si (KR); Beom Sik Bae, Suwon-si (KR); Song Yean Cho, Seoul (KR); Chae Gwon Lim, Seoul (KR); Guttman Erik, Waibstadt (DE)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/459,654

(22) Filed: Mar. 15, 2017

(65) Prior Publication Data

US 2017/0187689 A1 Jun. 29, 2017

Related U.S. Application Data

(63) Continuation of application No. 14/233,521, filed as application No. PCT/KR2012/005798 on Jul. 20, 2012, now Pat. No. 9,602,402.

(30) Foreign Application Priority Data

Jul. 20, 2011 (KR) .......................... 10-2011-0071968

(51) Int. Cl.
 H04L 29/06 (2006.01)
 H04L 29/08 (2006.01)
(52) U.S. Cl.
 CPC .......... *H04L 63/0407* (2013.01); *H04L 67/22* (2013.01); *H04L 67/303* (2013.01)
(58) Field of Classification Search
 CPC .... H04L 63/0407; H04L 67/308; H04L 67/22
 See application file for complete search history.

(56) References Cited

U.S. PATENT DOCUMENTS

| 7,184,418 | B1 | 2/2007 | Baba et al. |
| 9,602,402 | B2 * | 3/2017 | Jeong .................... H04L 67/303 |
| 2002/0035699 | A1 | 3/2002 | Crosbie |
| 2003/0200311 | A1 | 10/2003 | Baum |

(Continued)

FOREIGN PATENT DOCUMENTS

| JP | 2010-009262 A | 1/2010 |
| JP | 2011-215713 A | 10/2011 |

(Continued)

*Primary Examiner* — Mohammad S Anwar
(74) *Attorney, Agent, or Firm* — Jefferson IP Law, LLP

(57) ABSTRACT

The present invention relates to a system configuration and an apparatus for preventing the infringement of user privacy, and for collecting and analyzing information regardless of the service feature and type, while a system providing a context aware service collects and analyzes user information. The present invention discloses a method of configuring and using a context analyzer and a device profile database in order for the system providing the context aware service to collect and analyze information regardless of the service feature and type.

20 Claims, 7 Drawing Sheets

(56) References Cited

U.S. PATENT DOCUMENTS

| | | |
|---|---|---|
| 2007/0135121 A1 | 6/2007 | Bae et al. |
| 2009/0248680 A1 | 10/2009 | Kalavade |
| 2010/0180001 A1 | 7/2010 | Hardt |
| 2010/0222039 A1 | 9/2010 | Lindstrom et al. |
| 2011/0019644 A1 | 1/2011 | Cheon et al. |

FOREIGN PATENT DOCUMENTS

| | | |
|---|---|---|
| KR | 10-0443698 B1 | 8/2004 |
| KR | 10-2009-0045992 A | 5/2009 |
| WO | 01/20481 A2 | 3/2001 |

\* cited by examiner

METHOD AND APPARATUS FOR MANAGING DEVICE CONTEXT USING AN IP ADDRESS IN A COMMUNICATION SYSTEM

CROSS-REFERENCE TO RELATED APPLICATION(S)

This application is a continuation application of prior application Ser. No. 14/233,521, filed on Jan. 17, 2014, which will issue as U.S. Pat. No. 9,602,402 on Mar. 21, 2017, which is a U.S. National Stage application under 35 U.S.C. § 371 of an International application filed on Jul. 20, 2012 and assigned application number PCT/KR2012/005798, and claimed the benefit under 35 U.S.C. § 119(a) of a Korean patent application filed on Jul. 20, 2011 in the Korean Intellectual Property Office and assigned Serial number 10-2011-0071968, the entire disclosure of which is hereby incorporated by reference.

TECHNICAL FIELD

The present invention relates to a communication system and, in particular, to a method and apparatus for collecting and managing user activity and service usage context without invasion of user privacy.

BACKGROUND

The mobile communication system has been developed for the user to communicate on the move. With the rapid advance of technologies, the mobile communication system has evolved to the level capable of providing high speed data communication service as well as voice telephony service. Meanwhile, with the advent of high processing devices, auxiliary memory devices, and display devices, the user terminal manufacturing technology has developed to the extent that the smartphones capable of providing the user with high speed high quality data communication services on the move are popularized.

The development of high speed data communication service and widespread use of high performance smartphones spur the advent of novel user application services. Representative examples thereof include high quality multimedia video provision service (e.g. YouTube), Social Networking Service making it possible for users to share information and activity (e.g. Facebook), and search service allowing users to find information anytime anywhere (e.g. google).

The next generation application service providers are developing Context Aware Service technologies competitively to provide the more enhanced user experience. The context aware service is the technology of predicting the user's ultimate goal in the current situation based on the service usage history of the user to improve the user convenience. Accordingly, in order to provide the user with the context aware service, the service provider has to collect and retain the information previous user activity and service usage history information such as visited webpages, used keywords, viewed videos, communicated persons, frequently visited areas. As the amount of collected user information (i.e. context) increases, the context aware service can be provided more precisely.

However, the context aware service is likely to invade personal privacy in the process that the server collects information. There is therefore a need of developing the method capable of providing enriched context aware service without invading personal privacy.

SUMMARY

The present invention has been made in an effort to solve the above problem and aims to provide a method and apparatus for collecting and managing user activity and service usage context without invading user privacy in a communication service.

The system according to an embodiment of the present invention is characterized by introducing a context analyzer and a device profile database (DB) capable of collecting and analyzing user information independently of service type without invasion of user privacy in the procedure of collecting and analyzing user context for providing context aware service.

The system for providing context aware service according to an embodiment of the present invention is characterized in that an apparatus for collecting and analyzing the context uses the IP address in collecting and analyzing the user context without invasion of user privacy.

The system for providing context aware service according to an embodiment of the present invention is characterized by a method capable of collecting and analyzing context continuously even when the IP address assigned to the user device is changed in the state of using the old IP address so as to collect and analyze the user context without invasion of the user privacy.

The system for providing context aware service according to an embodiment of the present invention is characterized by a method of using an alias of the device in order for the apparatus of collecting and analyzing the context to collect and analyze the user context without invading user privacy.

In detail, a method for managing context in a communication system according to the present invention includes detecting a packet transmitted between a device and a server, requesting a device profile database for information on an IP address of the device by sending an IP request message, receiving an IP response message from the device profile database, and updating the context according to the IP address information in the IP response message.

Also, an apparatus for managing context in a communication system according to the present invention includes an interface which is responsible for wired or wireless communication with at least one node, a storage unit which stores context information associated with an IP address, and a control unit which detects a packet transmitted between a device and a server, requests a device profile database for information on an IP address of the device by sending an IP request message, and receives an IP response message from the device profile database, and updates the context according to the IP address information in the IP response message.

The present invention makes it possible for the user to provide the context aware service provider with user information anonymously and for the context aware service provider to collect user information without invading user privacy and provide the user with high value-added services. The service provider is capable of collecting and utilizing the user context in various fields independently of service type.

DETAILED DESCRIPTION

Detailed description of well-known functions and structures incorporated herein may be omitted to avoid obscuring the subject matter of the present invention. Exemplary embodiments of the present invention are described with reference to the accompanying drawings in detail.

Although the embodiments of the present invention are directed to the basic Internet system, it will be understood by those skilled in the art that the present invention can be applied even to other communication/computer systems having the similar technical background and system format, with a slight modification, without departing from the spirit and scope of the present invention.

In the following, the description on the present invention is directed to the system and apparatus capable of collecting and analyzing information independently of the characteristic and type of the service without invading user privacy in the context aware service provision system.

In the following description, the present invention proposes a method for the context aware service provision system to configure and use a Context Analyzer and a Device Profile DB for collecting and analyzing the information independently of the characteristic and type of the service. The present invention proposes a method for the context aware service provision system to collect and analyze the context based on the IP address and alias of the device without invading the user privacy.

Figure 1:
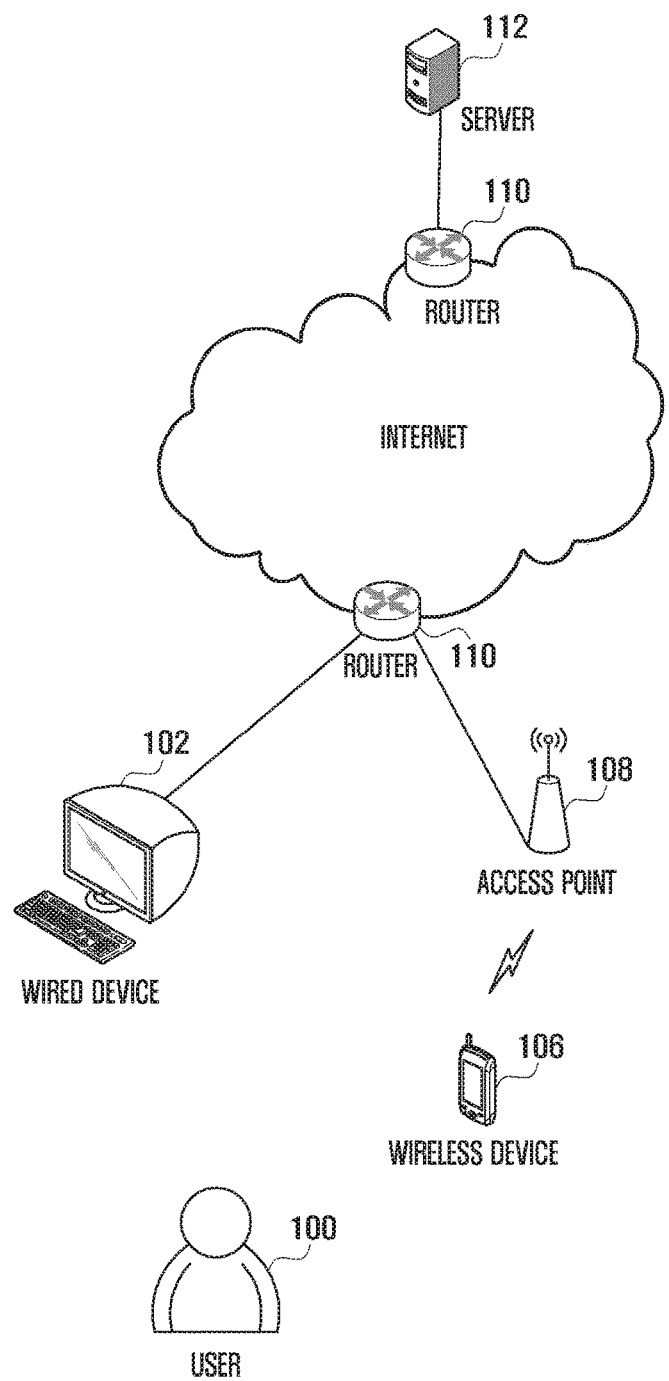
FIG. 1 is a diagram illustrating the network architecture for the conventional Internet service providers to provide users with context aware services.

FIG. 1 is a diagram illustrating the network architecture for the conventional Internet service providers to provide users with context aware services.

The user 100 may use a wired device 102 or a wireless device 106 for receiving Internet service. The user 100 logs on the Internet service provider server 112 and sends the server 112 the information requesting for the Internet service.

For example, the user sends the service provider server 112 its current location in order to use a location-based service. The service provider server 112 sends the user appropriate information and service back based on this information which is accumulated in the server 112 to improve the quality of the context aware service other than one-off use.

However, the user context collection procedure of the current service providers in the architecture of FIG. 1 has following drawbacks. First, since the user information is collected based on the log-on information of the subscribed user 100 to the server 112, the user privacy may be invaded. The user does not want the service provider to retain and use the user activity information illegally. For example, the service provider 112 may record the location of the user in real time and, if such information is collected and used without consent of the user, this may make the user 100 unpleasant.

Secondly, since the user context is stored per service provider, it is difficult to collect the user context in various ranges. For example, the multimedia video service provider and the location-based service provider may collect user contexts exclusively from each other.

The present invention has been conceived to solve the above problems and aims to provide a system structure capable of collecting user information without invasion of user privacy in the context aware service provision system and without limit to specific service providers.

Figure 2:
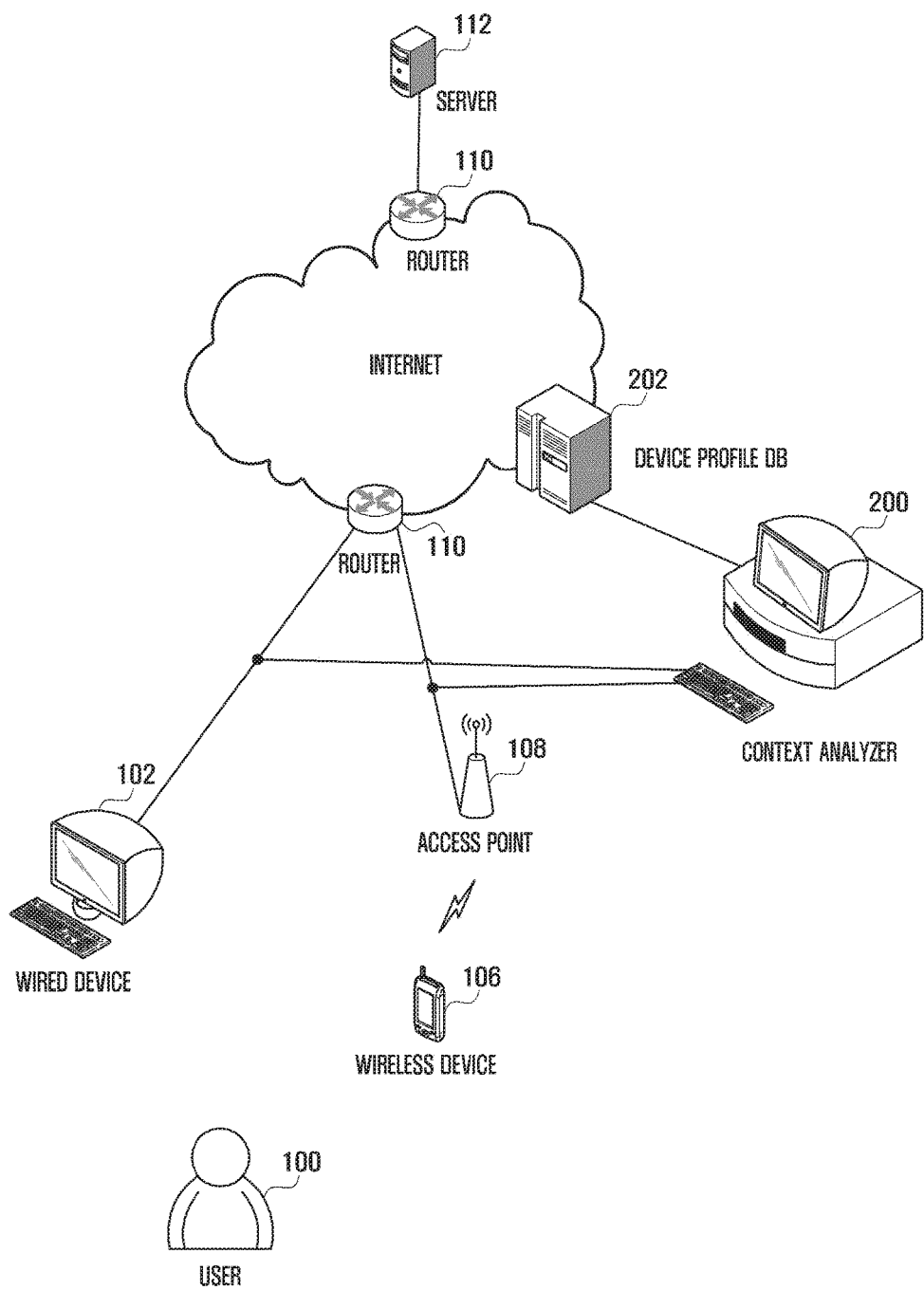
FIG. 2 is a diagram illustrating the network architecture for collecting and analyzing the context of the user interested in receiving various types of service without invading user privacy.

FIG. 2 is a diagram illustrating the network architecture for collecting and analyzing the context of the user interested in receiving various types of service without invading user privacy.

In the following description, the user context may include at least one of purchase detail, user location, preference, click history, and Social Networking Service (SNS) information.

In order to solve the problem of the conventional technology depicted in FIG. 1, the network architecture proposed by the present invention includes a Context analyzer 200 and a device profile database 202. The context analyzer 200 collects and analyzes user information in separation from the server 102 providing the service. The device profile DB 202 stores the information for hiding the actual owner of the collected user context.

In the network architecture proposed in an embodiment of the present invention as shown in FIG. 2, the context analyzer 200 positioned on the transmission path collects and analyzes the information which the user 100 transmits to the server 102. According to an embodiment of the present invention, it is advantageous to collect the information related to various types of services independently of the type and location of the service provider server 112. The context analyzer 200 may be owned and used by the Internet service provider or mobile communication network operator.

The device profile DB 202 is the facility of recording the IP address allocated to specific device without information on the user. That is, the device profile DB 202 stores the information on the IP address which is currently used by a specific device and whether the device allocated the current IP has used other IP address in the past. The device profile DB 202 may be depicted in the form of a table as table 1.

TABLE 1

| previous IP address | current IP address |
| --- | --- |
| 100.000.1011 | 121.516.6541 |
| 111.181.2201 | 221.321.6542 |
| 132.213.8465 | 135.321.6557 |
| — | — |

In another embodiment of the present invention, the device profile DB 202 may store the alias of the device using a specific IP address.

In this way, the method according to an embodiment of the present invention traces only the IP address of the device to manage the context information but not store or use the correlation between the IP address of the device and the actual device or the user, thereby protecting the user privacy from being invaded.

An embodiment of the present invention proposes a method of using the Internet Protocol (IP) address of the user device instead of the identifier representing the user directly such as user name, and resident registration number, and the identifier representing the user subscription information directly such as phone number and user ID without invading the user privacy. The present invention also proposes a method of collecting and analyzing the context continuously even when the IP address allocated to the user device is changed.

Figure 3:
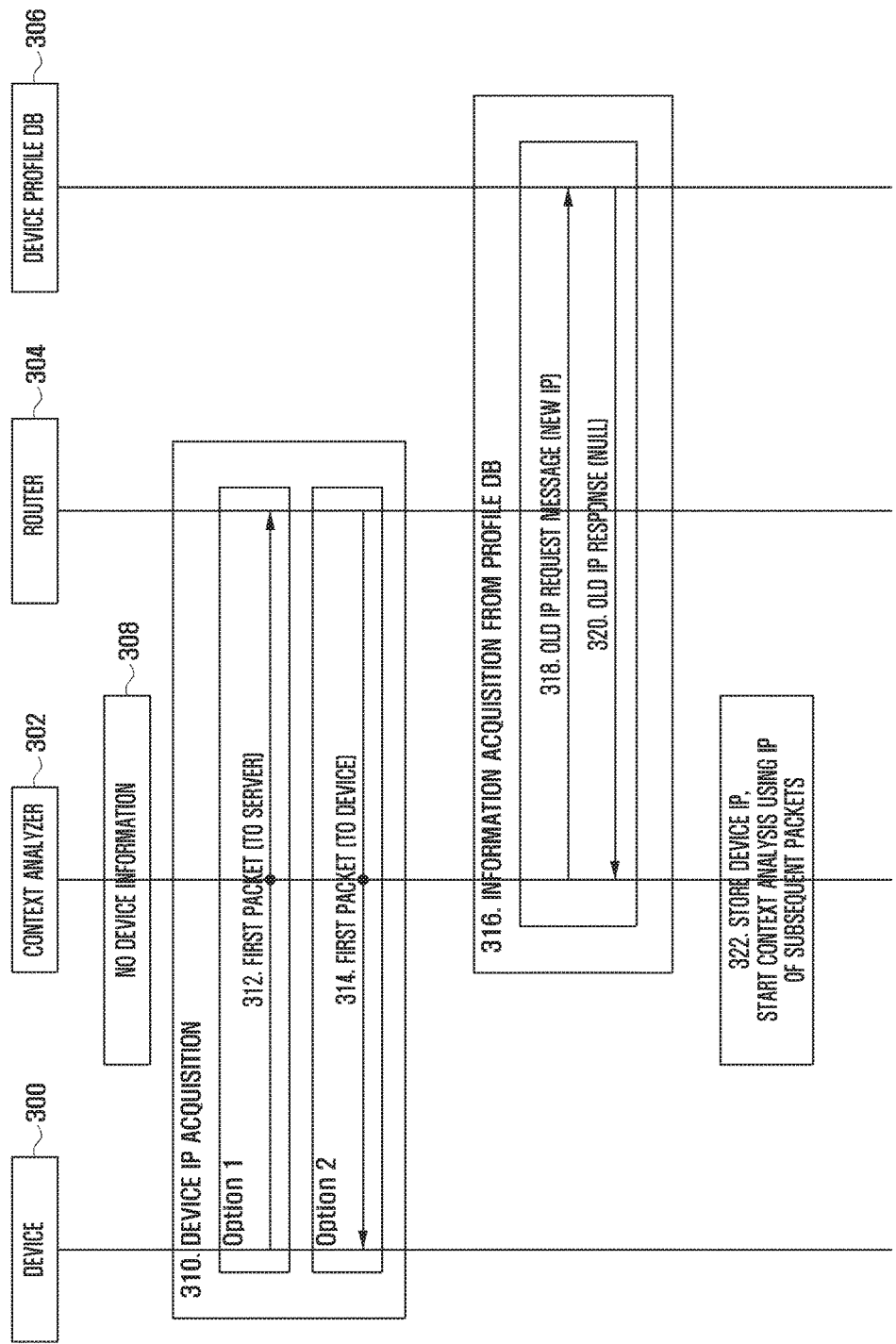
FIG. 3 is a flow diagram illustrating the procedure for the context analyzer 302 to store and analyze, when the device 300 connects to the system first, context using the IP address of the device 300.

FIG. 3 is a flow diagram illustrating the procedure for the context analyzer 302 to store and analyze, when the device 300 connects to the system first, context using the IP address of the device 300.

In the following description, it is assumed that the IP address of the device is allocated by a node such as gateway (not shown) and, if the IP address of the device is updated, the gateway notifies the device profile DB of this. Accordingly, the device profile DB may update the IP address of the device whenever the IP address of the device is changed.

Returning to FIG. 3, the context analyzer 302 has no information on the device 300 at step 308 before the user connects. This is because the initial connection of the device 300 to the system is assumed. The device 300 is assigned an IP address for use of Internet at step 310 and sends the server the first packet ate step 312.

Then, the context analyzer 302 detects this at step 310 (Option 1) sends the device profile DB 306 an IP request message (Old IP Request) for inquiry on whether the corresponding device 300 has any IP address used previously at step 318. If the device connects initially to receive the service, it has no old IP address and thus the device profile DB 306 sends the device 300 an IP response message (Old IP Response) to notify that it is a new device having no old IP address at step 320. In this case, the device profile DB 306 may be formed as shown in table 2. In table 2, it is noted that the old IP address corresponding to the analysis requested IP address 121.516.6541 is null.

TABLE 2

| Old IP address | Current IP address |
|---|---|
| null | 121.516.6541 |
| 111.181.2201 | 221.321.6542 |
| 132.213.8465 | 135.321.6557 |
| — | — |

The context analyzer 302 records the source IP address of the corresponding packet as the IP address of the device 300 and, afterward, stores and analyzes the context based on the packets transmitted/received with the corresponding IP address at step 322.

Meanwhile, if the first packet is transmitted from a server to the device 300 via the router 304 at step 314, the context analyzer 302 detects this at step 310 (Option 2) and sends the device profile DB 306 and IP request message for inquiry on whether the corresponding device 300 has any IP address used previously at step 318.

If the device connects initially to receive the service, it has no old IP address and thus the device profile DB 306 sends the device 300 an IP response message (Old IP Response) to notify that it is a new device having no old IP address at step 320. Then the context analyzer 302 records the destination IP address of the corresponding packet as the IP address of the device 300. Afterward, the context analyzer 302 stores and analyzes context using the packets transmitted/received with the corresponding IP address at step 322.

Figure 4:
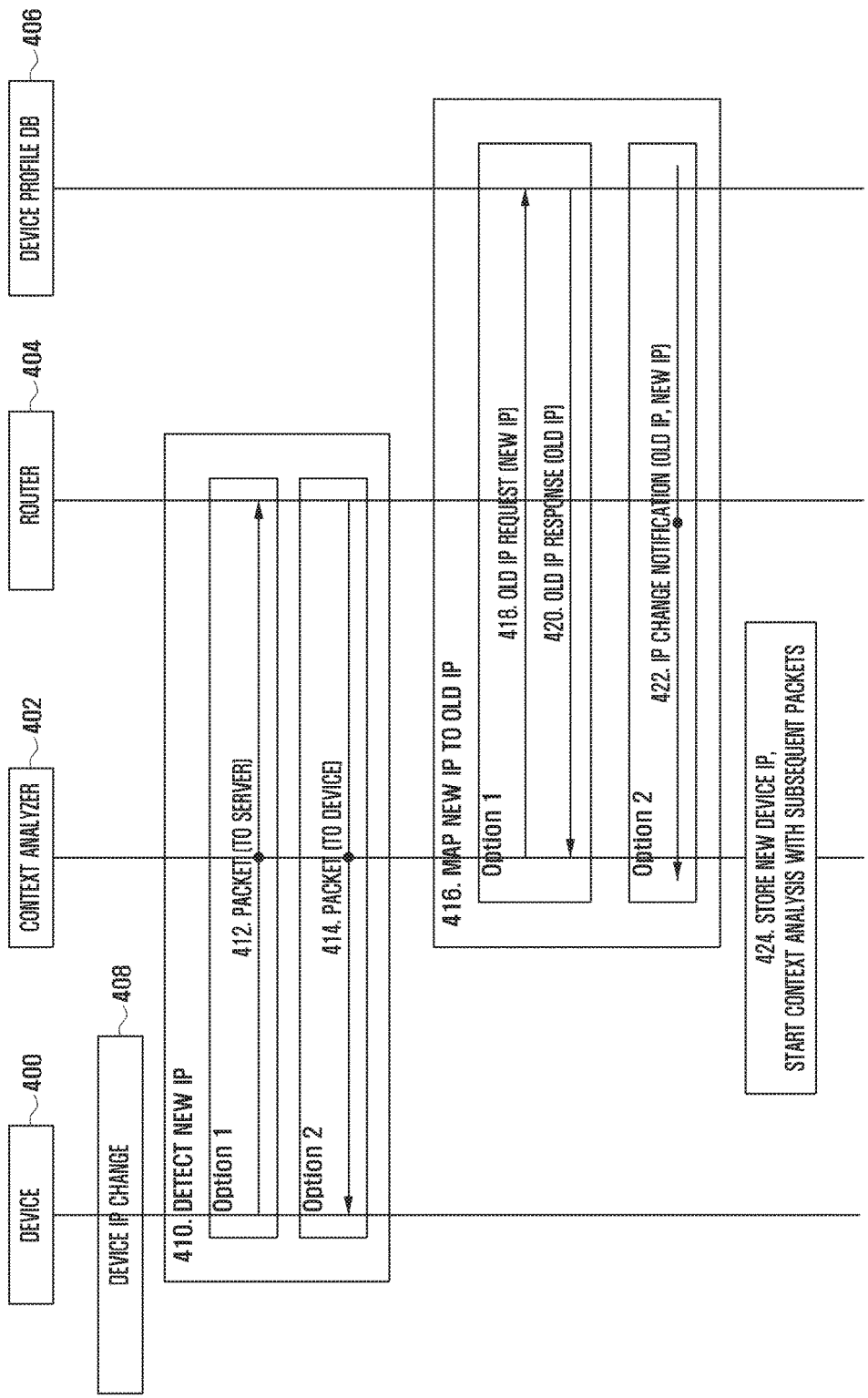
FIG. 4 is a flow diagram illustrating the procedure for the context analyzer 402 to detect, when the IP address assigned to the device 400 is changed, the change and associate the IP address with the previously stored and analyzed user information.

FIG. 4 is a flow diagram illustrating the procedure for the context analyzer 402 to detect, when the IP address assigned to the device 400 is changed, the change and associate the IP address with the previously stored and analyzed user information.

In the state that the user information is collected and analyzed according to the procedure depicted in FIG. 3, the IP address assigned to the device may be changed at step 408.

If the first packet is transmitted by the device 400 at step 412 after the change of the IP address of the device, the context analyzer 402 detects the appearance of a new IP address at step 410 (Option 1). Than the context analyzer 402 sends the device profile DB 406 an IP request message (Old IP Request) for inquiry on whether the corresponding device 400 has any IP address assigned previously at step 416 (Option 1). At this time, the context analyzer 402 sends the IP request message (Old IP Request) including the source IP address at step 418.

Then the device profile DB 406 search the DB for the old IP address assigned to the device 400 which uses the corresponding IP address. The device profile DB 406 sends the context analyzer 402 the IP response message (Old IP Response) including the old IP address information at step 420. In this embodiment, the device profile DB 406 may be formed as shown in table 3.

TABLE 3

| Old IP address | Current IP address |
|---|---|
| 125.544.8765 | 121.516.6541 |
| 111.181.2201 | 111.181.2201 |
| 132.213.8465 | 132.213.8465 |
| — | — |

Referring to table 3, suppose that the device using the old IP address is assigned a new IP address 121.516.6541. Then the context analyzer 402 requests the device profile DB 406 for the old IP address device which has used the IP address 121.516.6541. Then the device profile DB 406 checks the old IP address 125.544.8765 of the device using the IP address 121.516.6541. The device profile DB 406 sends the context analyzer 402 the retrieved IP address 125.544.8765. Then the context analyzer 402 is capable of checking the context occurring with the new IP address is associated with the device using the old IP address based on the old IP address received from the device profile DB.

Accordingly, the context analyzer 402 accumulates the new context onto the old context at step 424. That is, the old IP address is updated to the new IP address, and the context managed with the old IP address is changed to the context associated with the new IP address.

Detailed description is made thereof with reference to tables 4 and 5.

Table 4 is an exemplary user context management table retained by the context analyzer 402 before IP address update.

TABLE 4

| IP address | Context |
|---|---|
| 125.544.8765 | a1, a2, a3, |
| 111.181.2201 | b1, b2, b3, |

TABLE 4-continued

| IP address | Context |
|---|---|
| 132.213.8465 | c1, c2, c3, |
| — | — |

If the context analyzer 420 checks the IP address update from 125.544.8765 to 121.516.6541 as a result of the inquiry to the device profile DB 406, it updates table 4 to table 5.

TABLE 5

| IP address | Context |
|---|---|
| 125.544.8765 -> 121.516.6541(update) | a1, a2, a3, a4, a5, |
| 111.181.2201 | b1, b2, b3, |
| 132.213.8465 | c1, c2, c3, |
| — | — |

That is, the context analyzer 403 updates the IP address to a new one and updates the information a4 and a5 generated with the corresponding IP address to the context associated with the IP address 121.516.6541.

As described above, according to an embodiment of the present invention, the context analyzer 402 or the device profile DB stores and updates only IP addresses but not any information capable of identifying the real device or user. Accordingly, it is possible to provide the context aware service without invading user privacy.

After the IP address of the device 400 has changed, it may occur that the first packet is transmitted from a server to the device via the router 404. In this case, the context analyzer 402 detects the appearance of a new IP address at step 410 (Option 2) and sends the device profile DP 406 an IP request message (Old IP Request) to inquire whether there is any IP address assigned previously to the device 400 at step 416 (Option 1). For this purpose, the context analyzer 402 transmits the IP request message including the destination IP address at step 418. Then the device profile DB 406 search for the old IP address assigned to the device 400 using the corresponding IP address. The device profile DB 406 sends the context analyzer 402 the IP response message (Old IP Response) to notify of the old IP address of the device 400 at step 420.

Another embodiment of the present invention is described briefly hereinafter with reference to FIG. 4. FIG. 4 is directed to a method for the context analyzer 402, when the IP address of the device 400 is changed in the state of collecting and analyzing the user information at step 408, to detect the change and acquire the old IP address from the device profile DB 406.

According to another embodiment of the present invention, the device profile DB 406 may notifies the context analyzer 402 that the device 400 has used a specific IP address is assigned a new IP address at step 422. In this case, the context analyzer 402 is capable of checking that the user context generated with the new IP address is associated with the device which has used the old IP address based on the old address so as to accumulate the new context onto the old context at step 424.

In the method according to the another embodiment of the present invention, the context analyzer 402 or the device profile DB stores and updates only the IP address without storing or using any information capable of identifying the real device or user. Accordingly, it is possible to provide the context aware service without invasion of user privacy. A description is made of the device alias-based context collection and analysis method according to another embodiment of the present invention.

Figure 5:
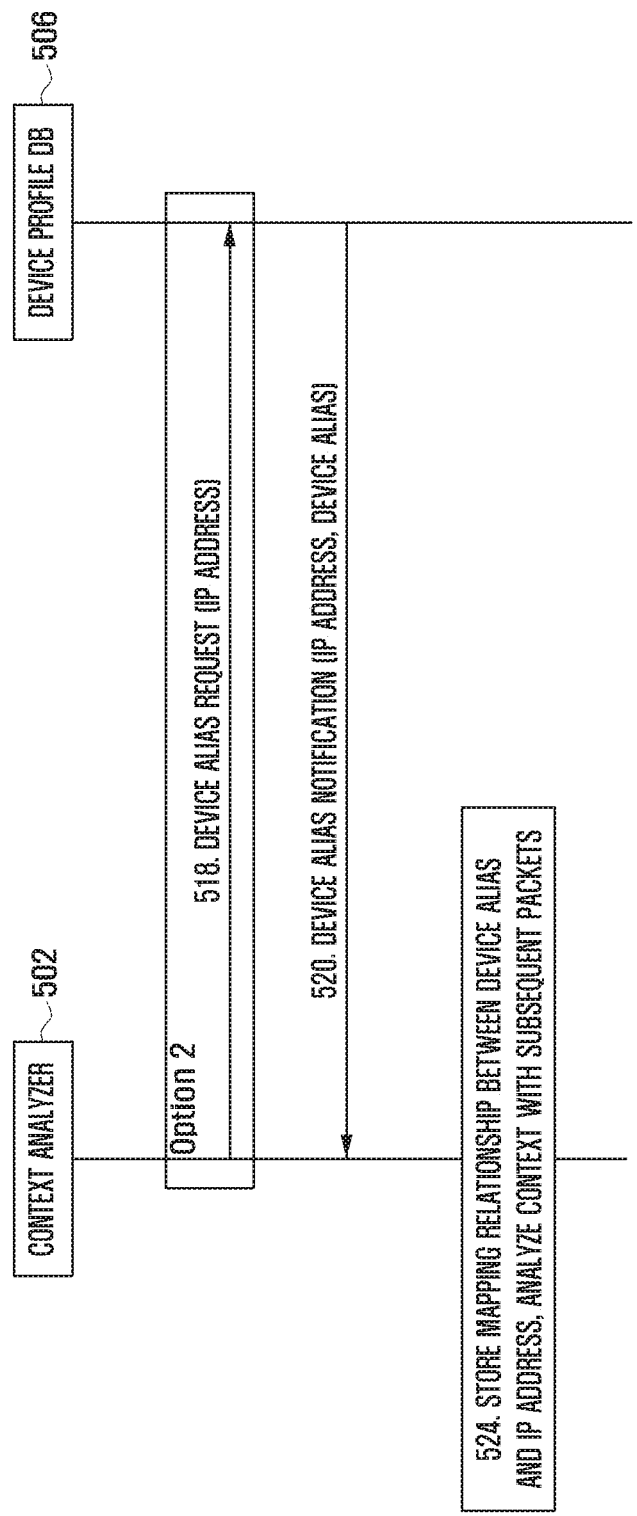
FIG. 5 is a flow diagram illustrating the procedure of collecting and analyzing context based on the device alias.

FIG. 5 is a flow diagram illustrating the procedure of collecting and analyzing context based on the device alias.

Since the operation of detecting, at the context analyzer 502, the packet transmitted to or received from the device with a new IP address is identical with that of the above embodiment, detailed description thereon is omitted herein.

If a new IP address is detected, the context analyzer 502 sends the device profile DB 506 a device alias request message at step 518 to inquire the alias of the device using the corresponding IP address.

Then the device profile DB 506 searches for the device assigned the corresponding IP address to check the alias of the device. In this embodiment, the device profile DB 506 is exemplified as shown in table 6. In table 6, the IP address is updated immediately when new IP address is assigned to the device.

TABLE 6

| Device (Alias) | IP address |
|---|---|
| Apple | 121.516.6541 |
| Bus | 221.321.6542 |
| mountain | 135.321.6557 |
| — | — |

If the IP address inquired by the context analyzer 502 is 221.321,6542, the device profile DB 506 notifies that the inquired IP address is assigned to the device alias 'bus' at step 520.

At this time, since any information capable of identifying the device is not stored or used in the system, the use of device alias is advantageous in privacy protection.

If the device alias received from the device profile DB 506 is a new one, the context analyzer 502 maps the device alias and the corresponding IP address and collects and analyzes the user context on the transmitted/received packets.

If the context analyzer 502 has the user context associated with the device alias already, the context analyzer 502 maps the device alias to the new IP address to continue collecting and analyzing the user context with the transmission/reception packets.

In this case, the user context management table retained by the context analyzer 502 is exemplified as shown in table 7.

TABLE 7

| Device (Alias) | Context |
|---|---|
| Apple | a1, a2, a3, |
| Bus | b1, b2, b3, |
| mountain | c1, c2, c3, |
| — | — |

For example, it is assumed that the context analyzer 502 receives a response including an IP address 211.321.6542 mapped to the device alias 'bus'. Then the context analyzer 502 updates the context collected with the IP address to the context in match with the device alias 'bus' as shown in table 7.

Figure 6:
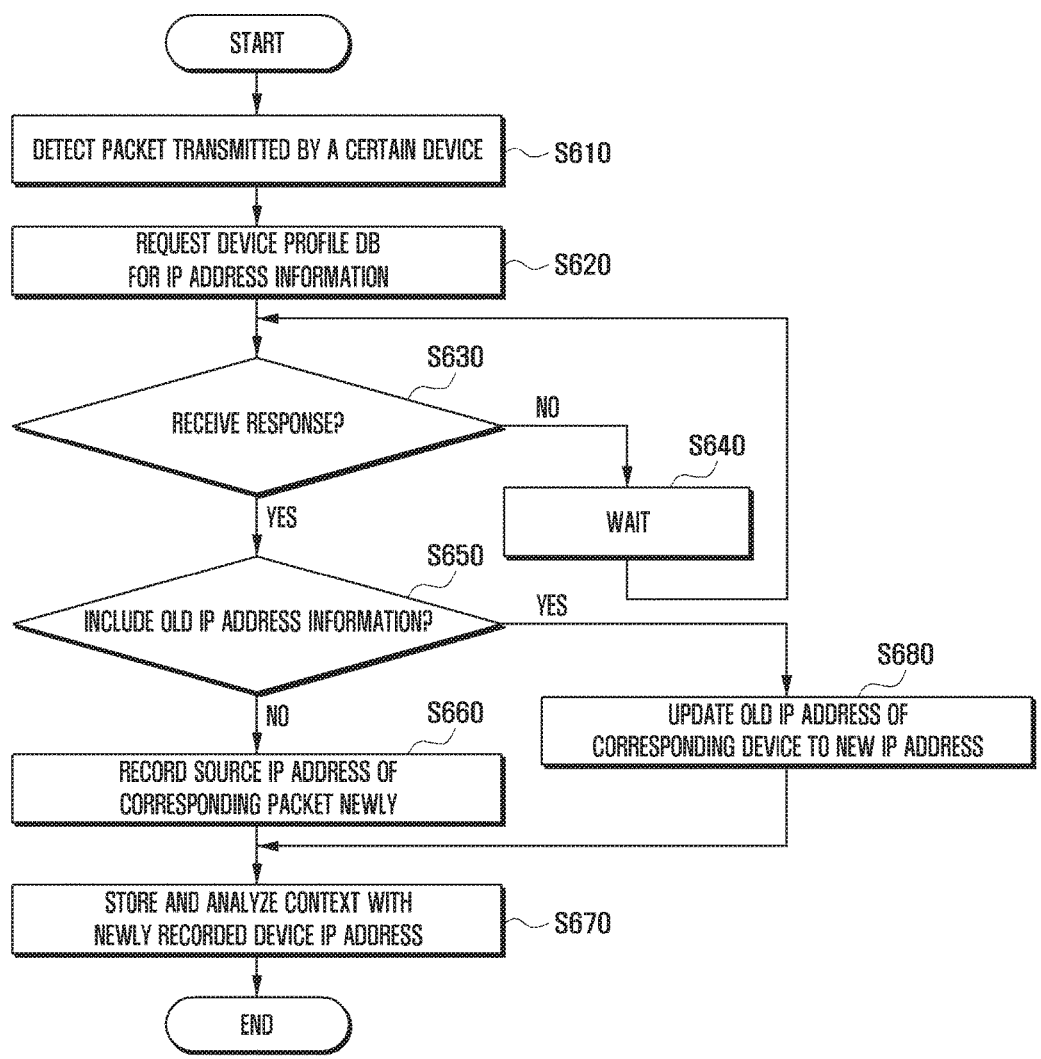
FIG. 6 is a flowchart illustrating the context management procedure of the context analyzer according to an embodiment of the present invention.

FIG. 6 is a flowchart illustrating the context management procedure of the context analyzer according to an embodiment of the present invention.

FIG. 6 shows the flow according to the representative embodiment of the present invention, and the flows according to other embodiment are clarified by referencing FIG. 6.

First, the context analyzer detects the packet transmitted by a certain device at step S610. The context analyzer requests the device profile DB for the information on the IP address of the device transmitting the packet at step S620. The information on the IP address denotes the IP address used by the same device before the assignment of the current IP address.

The context analyzer determines whether a response is received from the device profile DB at step S630. If no response is received, the context analyzer waits for the response transmitted by the device profile DB at step S640.

If the response is received, the context analyzer determines where the response includes the old IP address information used by the same device at step S650. If no old IP address information is included, the context analyzer records the source IP address of the detected packet at step S660. Otherwise if the old IP address information is included, the context analyzer updates the old IP address of the corresponding device to the new IP address.

The context analyzer stores and analyzes the user context information associated with the newly recorded device IP at step S670.

Figure 7:
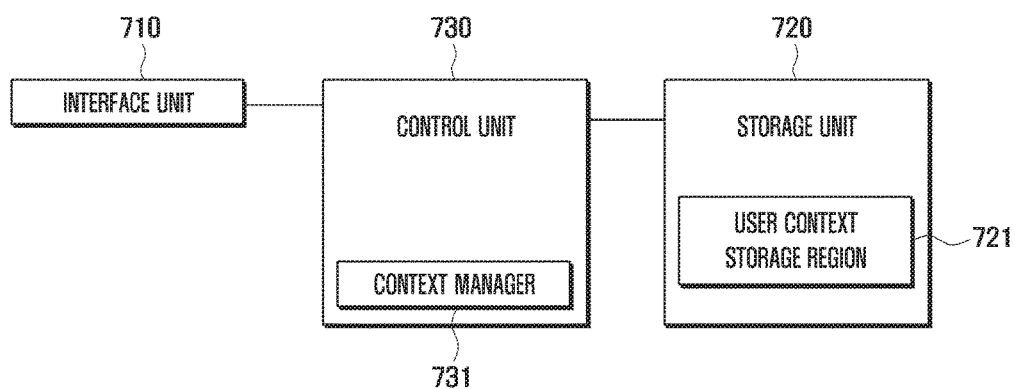
FIG. 7 is a block diagram illustrating a configuration of the context analyzer according to an embodiment of the present invention.

FIG. 7 is a block diagram illustrating a configuration of the context analyzer according to an embodiment of the present invention. As shown in FIG. 7, the context analyzer may include an interface unit 710, a storage unit 720, and a control unit 730.

The interface unit 710 is provided with a communication mean with network nodes according to an embodiment of the present invention. Particularly, the interface unit 710 of the present invention may include wired/wireless interface for detecting the packet transmitted from a wired or wireless terminal to the network and an interface with the device profile DB for requesting for the IP address information and receiving the response.

The storage unit is responsible for storing the program and data associated with the operation of the context analyzer. Particularly in an embodiment of the present invention, the storage unit 720 may include a user context storage region 721.

The user context storage region 721 may store the user context management table as exemplified in table 4. The user context management table includes an IP address field and a context field. The IP address is used as an identifier for identifying a certain device and updated continuously through communication between the context analyzer and the device profile DB. The context includes user information, and the user context may denote the information including at least one of purchase history, user location, preference, click history, Social Network Service (SNS) information.

The control unit controls overall operations of the context analyzer according to an embodiment of the present invention and signal flows among the blocks. According to an embodiment of the present invention, the control unit 730 may further include a context manager 731.

The context manager 731 may detect packets transmitted/received between device and server through wired or wireless link. The context manager 731 sends the device profile DB an IP request message to request for the information on the IP address of the device. The context manager 731 receives an IP response message transmitted by the device profile DB and controls updating the context based on the IP address information included in the IP response message.

In this case, the IP address information may denote the IP address used before the assignment of the current IP or the alias of the device using the currently assigned IP address.

If the device connects to the system initially, the IP response message does not include the information on the old IP address used previously. Otherwise if it is not the first connection to the system, the IP response message includes the information on the old IP address used previously. In this case, the context manager 731 controls such that the old IP address included in the context to be updated to the currently assigned IP address.

Although the description is directed to the case share the context manager 731 is implemented as a separate block and the blocks are responsible for different functions, this is only for the convenience purpose but the functions are not differentiated among each other. For example, a certain function of the context manager 731 may be executed by the control unit 730 in itself.

What is claimed is:

1. A method in a communication system, the method comprising:
  detecting data transmitted between a device, to which a new temporary identifier is assigned, and a first server;
  receiving, from a second server, information on a previous temporary identifier of the device based on the new temporary identifier of the device; and
  managing a user context of the device by mapping the previous temporary identifier of the device and the new temporary identifier of the device.

2. The method of claim 1, wherein the previous temporary identifier information comprises information for a previous IP address or a previous alias used by the device before a new IP address or a new alias is assigned.

3. The method of claim 2, wherein the managing of the user context comprises updating the previous IP address or the previous alias of the device to the new IP address or the new alias assigned currently for the device.

4. The method of claim 1, wherein the user context includes at least one of user activity information and user service usage information those comprise at least one of purchase history, user location, preference, click history, and social network server (SNS) information.

5. The method of claim 1, wherein the user context of the device is managed without a user identification of the device.

6. An apparatus in a communication system, the apparatus comprising:
  a transceiver;
  a storage unit for storing a user context; and
  at least one processor configured to:
    detect, via the transceiver, data transmitted between a device, to which a new temporary identifier is assigned, and a first server;
    receive, via the transceiver, from a second server, information on a previous temporary identifier of the device based on the new temporary identifier of the device; and
    manage the user context of the device by mapping the previous temporary identifier of the device and the new temporary identifier of the device.

7. The apparatus of claim 6, wherein the previous temporary identifier information comprises information for a previous IP address or a previous alias used by the device before a new IP address or a new alias is assigned.

8. The apparatus of claim 7, wherein the at least one processor is further configured to update the previous IP address or the previous alias of the device to the new IP address or the new alias assigned currently for the device.

9. The apparatus of claim 6, wherein the user context includes at least one of user activity information and user service usage information those comprise at least one of purchase history, user location, preference, click history, and social network server (SNS) information.

10. The apparatus of claim 6, wherein the at least one processor is further configured to manage the user context of the device without a user identification of the device.

11. A method in a communication system, the method comprising:
receiving, from a first server, a request for information on a previous temporary identifier of a device, the device to which a new temporary identifier is assigned, based on the new temporary identifier of the device; and
transmitting, to the first server, a message including the information on the previous temporary identifier of the device,
wherein a user context of the device is managed by mapping the previous temporary identifier of the device and the new temporary identifier of the device.

12. The method of claim 11, wherein the previous temporary identifier information comprises information for a previous IP address or a previous alias used by the device before a new IP address or a new alias is assigned.

13. The method of claim 12, wherein the previous IP address or the previous alias of the device is updated to the new IP address or the new alias assigned currently for the device.

14. The method of claim 11, wherein the user context includes at least one of user activity information and user service usage information those comprise at least one of purchase history, user location, preference, click history, and social network server (SNS) information.

15. The method of claim 11, wherein the user context of the device is managed without a user identification of the device.

16. An apparatus in a communication system, the apparatus comprising:
a transceiver;
a storage unit for storing a previous temporary identifier and a new temporary identifier of a device; and
at least one processor configured to:
receive, via the transceiver, from a first server, a request for information on the previous temporary identifier of the device, the device to which the new temporary identifier is assigned, based on the new temporary identifier of the device; and
transmit, via the transceiver, to the first server, a message including the information on the previous temporary identifier of the device,
wherein a user context of the device is managed by mapping the previous temporary identifier of the device and the new temporary identifier of the device.

17. The apparatus of claim 16, wherein the previous temporary identifier information comprises information for a previous IP address or a previous alias used by the device before a new IP address or a new alias is assigned.

18. The apparatus of claim 17, wherein the at least one processor is further configured to update the previous IP address or the previous alias of the device to the new IP address or the new alias assigned currently for the device.

19. The apparatus of claim 16, wherein the user context includes at least one of user activity information and user service usage information those comprise at least one of purchase history, user location, preference, click history, and social network server (SNS) information.

20. The apparatus of claim 16, wherein the user context of the device is managed without a user identification of the device.

* * * * *